April 18, 1961 R. E. MEYER 2,979,893
THRUST REVERSER
Filed April 2, 1958 2 Sheets-Sheet 1
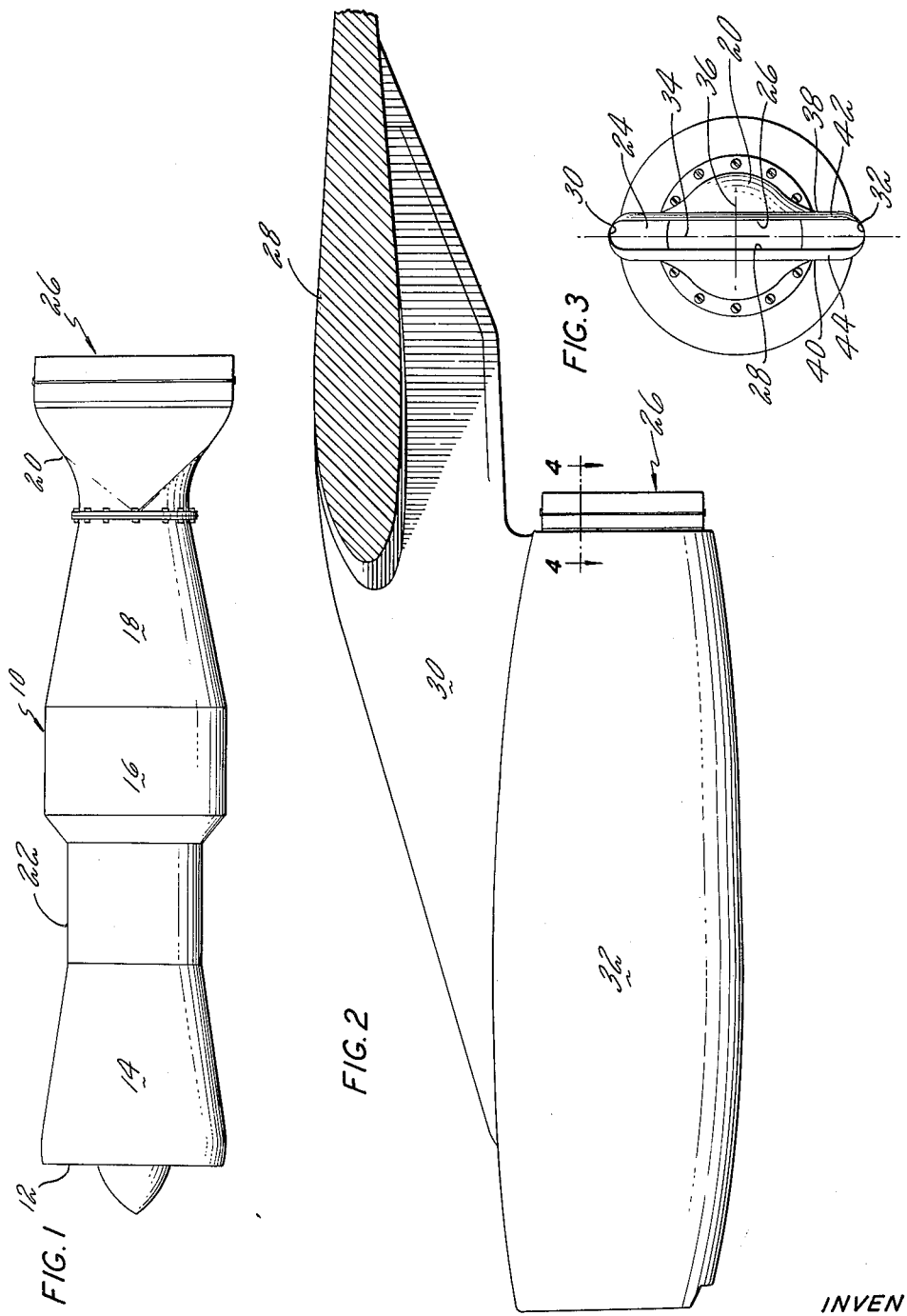
INVENTOR
ROBERT E. MEYER
BY Vernon F. Hauschild
ATTORNEY April 18, 1961  R. E. MEYER  2,979,893
THRUST REVERSER
Filed April 2, 1958  2 Sheets-Sheet 2
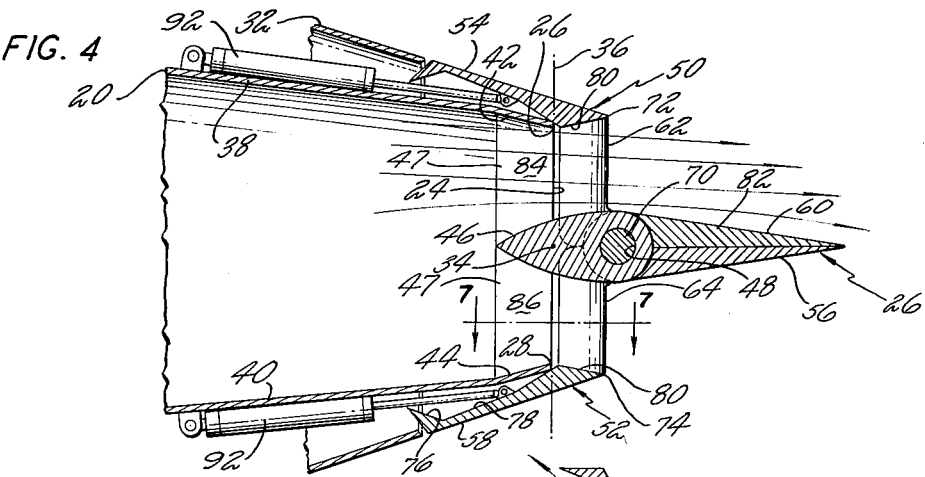
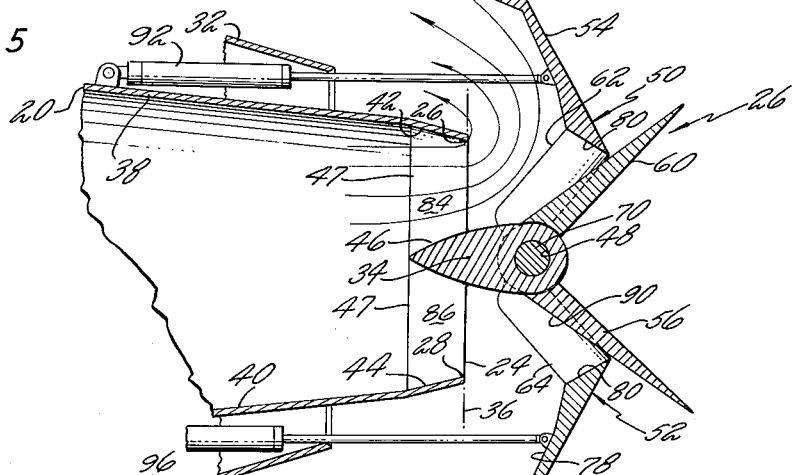
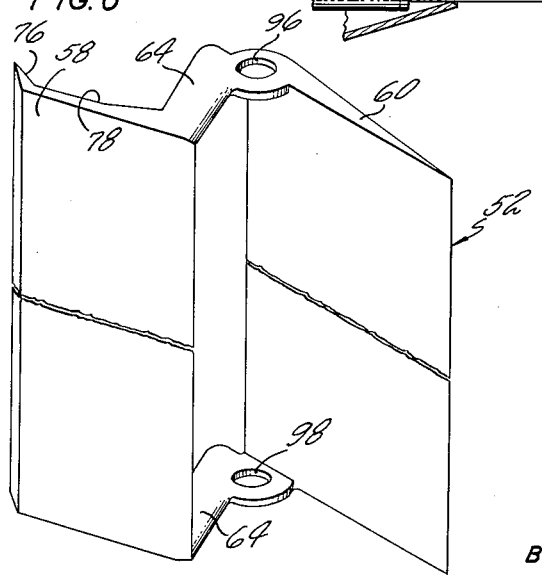
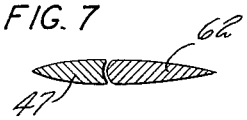
INVENTOR
ROBERT E. MEYER
BY Vernon F. Hauschild
ATTORNEY United States Patent Office 2,979,893
Patented Apr. 18, 1961

2,979,893

THRUST REVERSER

Robert E. Meyer, Glastonbury, Conn., assignor to United Aircraft Corporation, East Hartford, Conn., a corporation of Delaware Filed Apr. 2, 1958, Ser. No. 725,932

9 Claims. (Cl. 60—35.54)

This invention relates to thrust reverser mechanisms for use with flight powerplants which generate thrust by discharging exhaust gases to atmosphere and more particularly to thrust reverser mechanisms for use with straight-sided exhaust outlets of the type associated with jet wake noise suppression.

Aircraft jet engine technology has devised jet engine wake noise suppression or noise pattern directivity control mechanisms which utilize straight-sided and preferably slot-shaped exhaust gas outlets. It is an object of this invention to teach a thrust reverser unit adapted to be used with such a noise suppressing exhaust outlet.

It is a further object of this invention to teach a thrust reverser mechanism for use with a straight-sided exhaust outlet in which the thrust reverser parts are pivotable to a normal thrust position in which all thrust reverser parts are either clear of the exhaust gas stream or cooperate with other parts to present air-foil shaped structures thereto.

It is a further object of this invention to teach a thrust reverser unit for use with a straight-sided exhaust outlet in which a spike-type nozzle is formed by the thrust reverser parts during normal thrust operation to effect optimum nozzle coefficient.

It is a further object of this invention to teach a thrust reverser for use with a straight-sided exhaust outlet in which all thrust reverser parts rotate about a single axis thereby permitting simplicity of design with minimum weight.

It is a further object of this invention to teach a thrust reverser for use with a straight-sided exhaust outlet in which the thrust reverser parts are so positioned during normal thrust operation that the engine thrust losses are minimal.

It is a further object of this invention to teach a thrust reverser for use with a straight-sided exhaust outlet in which the thrust reverser parts are so shaped and coact with engine and nacelle parts that base drag increase is negligible.

It is a further object of this invention to teach a thrust reverser for use with a straight-sided exhaust outlet in which the thrust reverser parts are of sugh angularity and area that the unit is aerodynamically balanced.

It is a further object of this invention to teach a thrust reverser for use with a straight-sided exhaust outlet in which the thrust reverser parts coact to form two symmetric exhaust gas flow direction reversing passages symmetrically about the exhaust gas outlet, so that the thrust reverser unit may be considered to be either W-shaped or plural V-shaped in cross section and symmetric with respect to the exhaust outlet when in its reverse thrust position.

It is a further object of this invention to teach a thrust reverser for use with a straight-sided exhaust outlet in which the thrust reverser unit parts coact with the engine discharge duct to form convergent-divergent side surfaces along the exhaust gas outlet major axis during normal thrust operation.

Other objects and advantages will be apparent from the specification and claims, and from the accompanying drawings which illustrate an embodiment of the invention.

Fig. 1 is a side view of a conventional aircraft jet engine utilizing an exhaust gas discharge duct defining a straight-sided or slotted exhaust outlet with my thrust reverser unit positioned in its normal thrust position. No actuating mechanism is shown so as not to obstruct other structure.

Fig. 2 is a side view, partially in section, showing an aircraft wing and vertically extending engine support strut or pylon extending therefrom and supporting an aircraft engine of the type shown in Fig. 1 enveloped within an aircraft nacelle and showing my thrust reverser unit in its normal thrust position with respect to the straight-sided or slotted engine exhaust outlet.

Fig. 3 is an enlarged rear view showing of Fig. 1 with the thrust reverser unit removed to permit a clear illustration of the exhaust gas outlet.

Fig. 4 is an enlarged showing taken along line 4—4 of Fig. 2 and illustrates my thrust reverser unit coacting with the engine exhaust duct and the airplane nacelle in its retracted or normal thrust operating position.

Fig. 5 is a showing similar to Fig. 4 but with my thrust reverser unit in its operative or reverse thrust position.

Fig. 6 is an enlarged isometric showing of one of the two plate members which coact with the stationary strut member to form my thrust reverser unit.

Fig. 7 is a view taken along line 7—7 of Fig. 4.

In Fig. 1, modern aircraft turbojet engine 10 of the type taught in U.S. Patent Nos. 2,711,631 and 2,426,879 is shown to illustrate an environment for my thrust reverser unit, but it should be borne in mind that any powerplant which generates thrust by discharging exhaust gases to atmosphere could as well be used. Engine 10 comprises air inlet section 12, compressor section 14, burner section 16, turbine section 18 and exhaust gas discharge duct 20. Engine housing 22, which is preferably of circular cross section envelops the compressor, burner and turbine sections so that air enters engine 10 at inlet 12, is compressed in passing through compressor section 14, is heated in passing through burner section 16 and has energy extracted therefrom to drive compressor unit 14 in passing through turbine section 18 and is then directed into the engine exhaust gas discharge duct 20 which defines straight-sided or slotted engine exhaust gas outlet 24 which is shown in Fig. 3 and described in greater particularity in U.S. application Serial No. 712,418, to which reference may be made. Thrust reverser unit 26 is attached to discharge duct 20 in a fashion to be described in greater particularity hereinafter and performs the function of coacting with outlet 24 of discharge duct 20 to define an exhaust nozzle through which the engine exhaust gases will be discharged in a rearward direction during normal engine operation and in a reverse flow direction during reverse thrust operation.

Referring to Fig. 2, we see a cross section representation of aircraft wing 28 which carries vertically extending engine support strut or pylon 30 which in turn supports engine 10 within engine nacelle 32 so that vertically extending outlet 24 of engine discharge duct 20 and vertically extending thrust reverser unit 26 project rearwardly therefrom and align with vertical strut 30 as described in greater particularity in U.S. application Serial No. 712,418.

Referring to Fig. 3, we see engine discharge duct 20 which defines engine exhaust gas outlet 24, through which the engine exhaust gases are discharged to atmosphere to generate thrust. Outlet 24 is shown to be vertically directed and such is desirable for noise suppression or noise directivity pattern control as described in greater particularity in U.S. application Serial No. 712,418 but for the purposes of the thrust reverser unit 26 taught herein, need not necessarily be so oriented. Outlet 24 comprises straight or rectilinear sided surfaces 26 and 28, which are preferably parallel and coact with end portions 30 and 32 to define a slot-shaped aperture having a major or larger axis 34 and a minor or shorter axis 36. As used in the preceding sentence to describe elements 26 and 28, the word "straight" is defined as a one-dimensional continuum of points completely determined by any two of its points. The side surfaces 26 and 28 of outlet 24 constitute the terminating surfaces of the side surfaces 38 and 40 of discharge duct 20 which culminate in convergent walls 42 and 44 so as to define a nozzle throat at outlet 24. It should be noted that thrust reverser unit 26 has been removed from Fig. 3 to permit a clearer showing of exhaust gas outlet 24 and its defining elements.

Referring to Figs. 4 and 5, we see thrust reverser unit 26 in its normal thrust and reverse thrust positions, respectively, coacting with discharge duct 20 and engine nacelle 32. It will be noted that nacelle 32 terminates short or upstream of discharge duct 20. Thrust reverser unit 26 comprises strut 46 which is of air-foil or partial air-foil shape and extends along major axis 34 of outlet 24 for substantially the full length thereof and is attached to discharge duct 20 by support means 47, which are of partial air-foil cross section and extend between duct 20 and strut 46 preferably at the top and bottom of outlet 24. Strut 46 contains hole 48 which extends parallel to major axis 34 and serves to receive a pin 70 which also passes through the pivotable members 50 and 52 to permit the pivoting thereof. Thrust reverser unit 26 further includes pivotable plate members 50 and 52 each of which is pivotally attached to strut 46 and extends for substantially the full dimension thereof and comprises spaced and preferably substantially parallel plates 54 and 56; and 58 and 60, respectively, which are substantially parallel to walls 26 and 28 and extend substantially the length of major axis 34, and are connected in spaced relation by interconnecting means 62 and 64 so as to be positioned on opposite sides of major axis 34 of outlet 24. Interconnecting means 62 and 64 are of air-foil shape and so shaped to coact with support means 47 to form a full air-foil shape therewith, as shown in Fig. 7, to present to outlet 24 when in the normal thrust or Fig. 4 position. Plate members 50 and 52 may be pivoted about pin 70 to a normal thrust (Fig. 4) position in which the outer doors or first plates 54 and 58 are externally juxtapositioned opposite sides of duct 20 and serve to form an extension of nacelle 32 and coact with nacelle 32 and duct 20 to form a rearwardly tapering structure culminating in a point, such as 72 and 74, so as to present no drag creating surfaces. Plates 54 and 58 have similar plural inner surfaces such as 76, 78 and 80 of plate 58 and surface 80 is shaped to be divergent in the normal operation or Fig. 4 position so as to coact with convergent walls 42 and 44 of discharge duct 20 to form convergent-divergent side walls for exhaust gas outlet 24. It may be deemed desirable to provide a leaf-type seal between plates 54 and 58 and duct 20 to prevent gas flow therebetween or the parts may be contoured to abut. In the normal thrust or Fig. 4 position, the second plates 56 and 60 of plate members 50 and 52, respectively, are juxtapositioned and preferably abut downstream of strut 46 and coact therewith to present a full air-foil 82 to the exhaust gases passing through outlet 24. Full air-foil 82 is substantially centrally located with respect to the side surfaces 26 and 28 of outlet 24 and serves to form a spike-type nozzle therewith having gas flow passages 84 and 86 of substantially equal area on opposite sides thereof.

Referring to Fig. 5, we see thrust reverser unit 26 in its reverse thrust position. It will be noted that in this position, plate 54 of member 50 coacts with plate 60 of plate member 52 to form a substantially V-shaped exhaust gas flow direction reversing passage therewith while plate 58 of member 52 coacts with plate 56 of member 50 to form a similar V-shaped exhaust gas flow direction reversing passage symmetric about major axis 34 of outlet 24 with the first such passage. In effect, flow reverser unit 26 is forming a normal flow blockage and reversing structure of W-shaped cross section immediately downstream of and symmetric about major axis 34 of outlet 24. For example, the exhaust gases which pass through passage 86 pass in succession along surfaces 90, 88, 78 and 76, thereby having their direction changed to almost a reverse direction from normal discharge, yet clear of nacelle 32 and other structure so as not to damage same.

Since the two spaced plates of plate members 50 and 52 are on opposite sides of major axis 34 at all times, their angularity and area may be chosen so that the exhaust gases acting upon each create substantially equal aerodynamic forces thereagainst so that members 50 and 52 are in aerodynamic balance, thereby requiring minimal actuating forces.

Any convenient actuating means may be used, but for purposes of illustration, I show a pressurized cylinder-piston unit 92 which is pivotably attached to engine 10 or to nacelle 32 and to members 50 and 52. Obviously, the farther from pin 70 that the actuating means attaches to members 50 and 52, the greater will be its mechanical advantage.

Referring to Fig. 6, we see an isometric representation of one of our pivotable plate members 52 to illustrate the spaced relationship which exists between plural spaced plates 58 and 60 together with interconnecting means 64 which connect plates 58 and 60 to be substantially parallel and so that members 58, 60 and 64 form a rough Z-shape. Member 52 contains holes 96 and 98 which align with hole 48 of strut 46 to receive pin 70 and permit the pivotal action of member 52 about strut 46.

It will be obvious to those skilled in the art that by control of the actuating fluid to actuators 92, as taught in U.S. Patent No. 2,715,311, or by interconnecting plate members 50 and 52 either as taught in U.S. Patent No. 2,714,285 or by mating gear segments, these plate members will be caused to actuate simultaneously and only one actuator is needed when the plate members are so interconnected.

It is to be understood that the invention is not limited to the specific embodiment herein illustrated and described but may be used in other ways without departure from its spirit as defined by the following claims.

I claim:

1. An exhaust gas discharge duct terminating in an exhaust outlet defining the exit opening thereof and having two opposed straight sides, a thrust reverser unit comprising substantially Z-shaped plate structures extending across said outlet and parallel to said straight sides and positioned to pivot about a line substantially midway between said straight sides and being pivotable and so shaped to form an airfoil shaped structure in said outlet and also being pivotable and so shaped to form a solid, flow blocking structure of W-shaped cross-section adjacent said outlet and shaped to block and reverse all exhaust gas passing through said outlet.

2. An exhaust gas discharge duct terminating in an exhaust gas outlet defining the exit opening thereof and having opposed substantially straight sides, a thrust reverser unit comprising a strut of partial airfoil shape spanning said outlet substantially midway between said sides, and substantially flat Z-shaped plate structures pivotable about said strut to a first position in which said plate structures coact with said strut to present a full airfoil to said outlet and to a second position in which said plate structures coact with said strut to form two, continuous symmetric gas flow reversing passages rearwardly of and adjacent said outlet.

3. An exhaust gas discharge duct terminating in an exhaust gas outlet defining the exit opening thereof and having opposed substantially straight sides, a thrust reverser unit comprising a strut of partial airfoil shape spanning said outlet substantially midway between said sides, and a first and second substantially Z-shaped plate structure each comprising a first plate and a second plate spaced therefrom and each pivotable about said strut to a first position in which said plates coact with said strut to present a full airfoil to said outlet and to a second position in which said first plate and said second plate of said first structure cooperate with said second plate and said first plate, respectively, of said second structure and coact with said strut to form two symmetric, continuous, gas flow reversing passages adjacent said outlet.

4. An exhaust gas discharge duct terminating in an exhaust gas outlet defining the exit opening thereof and with a major and a minor axis and with substantially straight sides along said major axis, a thrust reverser unit comprising a strut of partial airfoil shape extending along said outlet major axis for the full dimension thereof, and two plate structures pivotally attached to said strut and extending therealong for substantially the full dimension thereof and each comprising a first and second plate which are substantially parallel and located on opposite sides of said major axis, interconnecting means connecting said first and second plates of each of said plate structures, and means to pivot said plate structures to a first position in which said first plates are juxtapositioned said duct on opposite exterior sides thereof and extending substantially parallel said outlet straight sides and in which said second plates are juxtapositioned and coact with said strut to present a full airfoil to said outlet so that substantially equal area gas passages are defined between said strut and said outlet straight sides and to a second position in which the plates of said structures on similar sides of said outlet major axis abut and coact with said strut to form symmetric flow reversing passages of V-shaped cross-section on opposite sides of said outlet major axis.

5. An exhaust gas discharge duct terminating in an exhaust gas outlet defining the exit opening thereof and with a major and a minor axis and with substantially straight sides along said major axis, a thrust reverser unit comprising a strut of partial airfoil shape extending along said outlet major axis for the full dimension thereof, and two plate structures pivotally attached to said strut and extending therealong for substantially the full dimension thereof and each comprising a first and a second plate which are substantially parallel and located on opposite sides of said major axis, interconnecting means connecting said first and second plates of each of said plate structures, and means to pivot said plate structures to a first position in which said first plates are juxtapositioned said duct on opposite exterior sides thereof and extending substantially parallel said outlet straight sides and in which said second plates are juxtapositioned and coact with said strut to present a full airfoil to said outlet so that substantially equal area gas passages are defined between said strut and said outlet straight sides and to a second position in which the plates of said structures on similar sides of said outlet major axis abut and coact with said strut to form symmetric flow reversing passages of V-shaped cross-section on opposite sides of said outlet major axis, said first and second plates of each of said plate structures being of such size and angularity that said plate structures will be in aerodynamic balance when exhaust gases flow through said outlet.

6. An exhaust gas discharge duct having a gas flow axis and further having convergent walls and terminating in an exhaust gas outlet defining the exit opening thereof and with a major and a minor axis extending transversely of said flow axis and with substantially straight sides along said major axis, a thrust reverser unit comprising a strut of partial airfoil shape extending along said outlet major axis for the full dimension thereof, and two plate structures pivotally attached to said strut and extending therealong for substantially the full dimension thereof and each comprising a first plate having a plural surface side and second plate which are substantially parallel and located on opposite sides of said major axis, interconnecting means connecting said first and second plates of each of said plate structures, and means to pivot said plate structures to a first position in which said first plates are juxtapositioned said duct on opposite exterior sides thereof and extending substantially parallel said outlet straight sides with one of said plural surfaces coacting with said duct walls to define a convergent-divergent nozzle and in which said second plates are juxtapositioned and coact with said strut to present a full airfoil to said outlet so that substantially equal area gas passages are defined between said strut and said outlet straight sides and to a second position in which the plates of said structures on similar sides of said outlet major axis abut and coact with said strut to form symmetric flow reversing passages of V-shaped cross-section on opposite sides of said outlet major axis.

7. An aircraft engine which generates thrust by discharging exhaust gases to atmosphere through a nozzle terminating in a slot shaped outlet defining the exit opening thereof and having a gas flow axis and further having a major and a minor axis extending transversely of said flow axis, a nacelle enveloping said engine and terminating short of said outlet, a thrust reverser unit comprising a strut extending along the major axis of said outlet and two plate members pivotally attached to said strut and extending for substantially the full length thereof and each comprising two spaced plates positioned on opposite sides of said major axis, and means to pivot said plate structures to a normal thrust position in which a first plate of each structure is externally juxtapositioned said duct on opposite sides thereof, while forming a continuation of said nacelle so that said nacelle, duct and first plate coact to define a tapering aerodynamic drag free structure and in which the second plates of each structure abut and coact with said strut to present an airfoil shape to said outlet while defining equal area engine exhaust gas passages with said duct on opposite sides of said major axis through which the engine exhaust gases are discharged to atmosphere during normal engine operation and to a reverse thrust position in which the first plate on each structure coacts with the second plate of the other structure and said strut to define a W-shaped exhaust gas blockage and flow direction reversing structure immediately downstream of and symmetric about said major axis to cause direction reversal of engine exhaust gases during engine reverse thrust operation.

8. An aircraft engine which generates thrust by discharging exhaust gases to atmosphere through a discharge duct having convergent side walls and terminating in a vertical slot shaped outlet defining the exit opening thereof and having a gas flow axis and further having a major and a minor axis extending transversally of said flow axis, a nacelle enveloping said engine and terminating short of said outlet, a thrust reverser unit comprising a strut extending along the major axis of said outlet and two plate structures pivotally attached to said strut and extending for substantially the full length thereof and each comprising two spaced plates positioned on opposite sides of said major axis, and means to pivot said plate structures to a normal thrust position in which a first plate of each structure is externally juxtapositioned said duct on opposite sides thereof, while forming a continuation of said nacelle so that said nacelle, duct and first plate coact to define a tapering aerodynamic drag free structure and on which the second plates of each structure abut and coact with said strut to present an airfoil shape to said outlet while defining equal area engine exhaust gas passages with said duct on opposite sides of said major axis through which the engine exhaust gases are discharged to atmosphere during normal engine operation and to a reverse thrust position in which the first plate on each structure coacts with the second plate of the other structure and said strut to define a W-shaped exhaust gas blockage and flow direction reversing structure immediately downstream of and symmetric about said major axis to cause direction reversal of engine exhaust gases during engine reverse thrust operation.

9. An exhaust gas discharge duct terminating in an exhaust gas outlet defining the exit opening thereof and having a gas flow axis and further with a major and a minor axis extending transversally of said flow axis and with substantially straight sides along said major axis, a thrust reverser unit comprising a strut of partial airfoil shape extending along said outlet major axis for the full dimension thereof, support means supporting said strut in said outlet and two plate structures pivotally attached to said strut and extending therealong for substantially the full dimension thereof and each comprising a first and second plate which are substantially parallel and located on opposite sides of said major axis, interconnecting means connecting said first and second plates of each of said plate structures, and means to pivot said plate structures to a first position in which said first plates are juxtapositioned said duct on opposite exterior sides thereof and extending substantially parallel said outlet straight sides and in which said second plates are juxtapositioned and coact with said strut to present a full airfoil to said outlet so that substantially equal area gas passages are defined between said strut and said outlet straight sides and further in which said support means and said interconnecting means coact to present an airfoil shape to said outlet and to a second position in which the plates of said structures on similar sides of said outlet major axis abut and coact with said strut to form symmetric flow reversing passages of V-shaped cross-section on opposite sides of said outlet major axis.

References Cited in the file of this patent

UNITED STATES PATENTS

| | | |
|---|---|---|
| 2,620,622 | Lundberg | Dec. 9, 1952 |
| 2,798,362 | Rainbow et al. | July 9, 1957 |
| 2,839,891 | Drakeley | June 24, 1958 |

FOREIGN PATENTS

| | | |
|---|---|---|
| 1,066,499 | France | Jan. 20, 1954 |
| 1,112,593 | France | Nov. 16, 1955 |
| 789,836 | Great Britain | Jan. 29, 1958 |